(12) United States Patent
Delaney et al.

(10) Patent No.: US 7,801,093 B2
(45) Date of Patent: Sep. 21, 2010

(54) SIGNAL TRANSFER POINT WITH WIRELESS SIGNALING LINK INTERFACE

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1043 days.

(21) Appl. No.: 10/993,089

(22) Filed: Nov. 19, 2004

(65) Prior Publication Data
US 2005/0111421 A1 May 26, 2005

Related U.S. Application Data

(60) Provisional application No. 60/523,816, filed on Nov. 20, 2003.

(51) Int. Cl.
*H04W 4/00* (2009.01)
(52) U.S. Cl. ........................ 370/338; 370/352; 370/328; 370/401; 455/422.1; 455/41.2; 455/445; 455/417
(58) Field of Classification Search ................ 370/338, 370/352, 331–333, 328; 455/435.1, 433, 455/41.2; 379/211.01
See application file for complete search history.

(56) References Cited

U.S. PATENT DOCUMENTS

| | | | | |
|---|---|---|---|---|
| 5,623,495 A * | 4/1997 | Eng et al. | ................ | 370/397 |
| 5,680,552 A * | 10/1997 | Netravali et al. | ............. | 709/250 |
| 5,966,431 A * | 10/1999 | Reiman et al. | .......... | 379/115.01 |
| 6,122,255 A | 9/2000 | Bartholomew et al. | | |
| 6,272,129 B1 * | 8/2001 | Dynarski et al. | ............ | 370/356 |
| 6,512,751 B1 * | 1/2003 | Struhsaker et al. | .......... | 370/329 |
| 6,590,885 B1 * | 7/2003 | Jorgensen | ................ | 370/338 |
| 6,594,258 B1 * | 7/2003 | Larson et al. | ............... | 370/353 |
| 6,658,259 B2 * | 12/2003 | McIntosh | ................ | 455/462 |
| 6,680,922 B1 * | 1/2004 | Jorgensen | ................ | 370/328 |
| 6,714,522 B1 * | 3/2004 | Lee | ................ | 370/318 |
| 6,721,306 B1 * | 4/2004 | Farris et al. | ............... | 370/352 |
| 6,738,821 B1 | 5/2004 | Wilson et al. | | |
| 6,871,070 B2 * | 3/2005 | Ejzak | ................ | 455/435.1 |
| 6,882,692 B2 | 4/2005 | Somayazulu | | |
| 7,142,852 B2 * | 11/2006 | Tell et al. | ................ | 455/426.2 |
| 7,200,112 B2 * | 4/2007 | Sundar et al. | ............... | 370/230 |
| 7,260,086 B2 * | 8/2007 | Delaney et al. | ............. | 370/352 |

(Continued)

FOREIGN PATENT DOCUMENTS

WO WO 00/43971 A1 7/2000

(Continued)

OTHER PUBLICATIONS

International Search Report and Written Opinion of the International Searching Authority corresponding to PCT application No. PCT/US04/38826 dated Jun. 21, 2006.

(Continued)

*Primary Examiner*—Sharad Rampuria
(74) *Attorney, Agent, or Firm*—Jenkins, Wilson, Taylor & Hunt, P.A.

(57) ABSTRACT

An STP includes a link interface module for performing SS7 signal transfer functions, such as routing messages between SS7 signaling points. A WLAN signaling link interface is operatively associated with the link interface module for sending and receiving SS7 signaling messages over a wireless signaling link.

31 Claims, 7 Drawing Sheets

U.S. PATENT DOCUMENTS

| | | | |
|---|---|---|---|
| 7,286,516 B2 * | 10/2007 | Delaney et al. | 370/338 |
| 7,466,978 B1 * | 12/2008 | Chapman et al. | 455/422.1 |
| 7,706,343 B2 | 4/2010 | Delaney et al. | |
| 2001/0029182 A1 | 10/2001 | McCann et al. | |
| 2002/0085516 A1 * | 7/2002 | Bridgelall | 370/329 |
| 2002/0131400 A1 * | 9/2002 | Tinsley et al. | 370/352 |
| 2002/0191572 A1 | 12/2002 | Weinstein et al. | |
| 2003/0053434 A1 * | 3/2003 | Chow et al. | 370/338 |
| 2003/0093187 A1 | 5/2003 | Walker | |
| 2003/0120920 A1 | 6/2003 | Svensson | |
| 2003/0133421 A1 * | 7/2003 | Sundar et al. | 370/328 |
| 2004/0013097 A1 * | 1/2004 | Massa | 370/335 |
| 2004/0072593 A1 * | 4/2004 | Robbins et al. | 455/560 |
| 2004/0114741 A1 | 6/2004 | Ngo et al. | |
| 2004/0258028 A1 | 12/2004 | Hossain et al. | |
| 2005/0002407 A1 | 1/2005 | Shaheen et al. | |
| 2005/0088999 A1 | 4/2005 | Waylett et al. | |
| 2005/0113067 A1 | 5/2005 | Marcovici et al. | |
| 2006/0004643 A1 * | 1/2006 | Stadelmann et al. | 705/34 |
| 2007/0110018 A1 | 5/2007 | Delaney et al. | |
| 2009/0325584 A1 * | 12/2009 | Pan | 455/445 |

FOREIGN PATENT DOCUMENTS

| | | |
|---|---|---|
| WO | WO 01/03438 A2 | 1/2001 |
| WO | WO 02/19662 A1 | 3/2002 |
| WO | WO 03/029922 A2 | 4/2003 |
| WO | WO 03/073676 A2 | 9/2003 |

OTHER PUBLICATIONS

Office Action for U.S. Appl. No. 10/937,930 (Feb. 8, 2007).
Office Action for U.S. Appl. No. 10/937,930 (Aug. 9, 2006).
Office Action for U.S. Appl. No. 10/937,930 (Feb. 23, 2006).
Office Action for U.S. Appl. No. 10/937,930 (Jun. 1, 2005).
Notice of Allowance for U.S. Appl. No. 10/937,930 (Aug. 15, 2007).
Non-Final Office Action for U.S. Appl. No. 11/651,724 (Jun. 8, 2009).
Interview Summary for U.S. Appl. No. 10/937,930 (Jan. 16, 2007).
Notification of European Publication Number and Information on the Application of Article 67(3) EPC for European Application No. 04788686.6 (May 24, 2006).
Communication pursuant to Rules 109 and 110 EPC for European Application No. 04788686.6 (May 4, 2006).
Notification of Transmittal of the International Search Report and the Written Opinion of the International Searching Authority, or the Declaration for International Application No. PCT/US04/29606 (Oct. 6, 2005).
Crowe, "SS7 & Wireless: Walking Into the Sunset?," Telephony, pp. 1-4 (Apr. 15, 1999).
Notice of Allowance and Fee(s) Due for U.S. Appl. No. 11/651,724 (Dec. 11, 2009).

* cited by examiner

SIGNAL TRANSFER POINT WITH WIRELESS SIGNALING LINK INTERFACE

RELATED APPLICATIONS

This application claims the benefit of U.S. Provisional Patent Application Ser. No. 60/523,816, filed Nov. 20, 2003, the disclosure of which is incorporated herein by reference in its entirety.

TECHNICAL FIELD

The subject matter described herein relates to signal transfer points. More particularly, the subject matter described herein relates to methods and systems for providing signal transfer points with wireless local area network (WLAN) interfaces.

BACKGROUND ART

Figure 1:
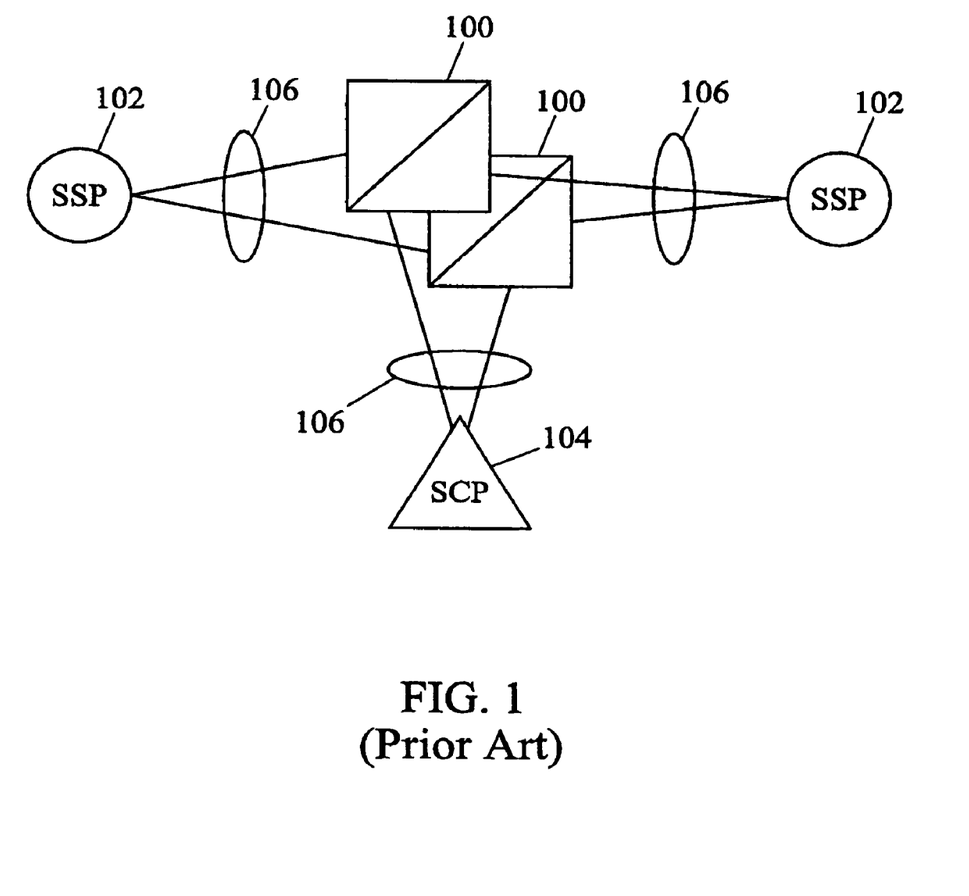
FIG. 1 is a network diagram illustrating conventional wireline-based STPs.

In conventional telecommunication signaling systems, signaling points are connected via dedicated wireline TDM signaling links. FIG. 1 illustrates a conventional telecommunications signaling system in which signaling points are interconnected via wireline TDM signaling links. In FIG. 1, a pair of signal transfer points 100 are connected to service switching points 102 and a service control point 104 via TDM signaling links 106. Signal links 106 are bi-directional communications facilities used to send signaling messages to and receive signaling messages from other nodes in the network. Examples of such signaling messages include ISUP messages, TCAP messages, MAP messages, and IP telephony signaling messages. It is the responsibility of the signaling links to provide reliable, on-time delivery of such messages.

Due to the reliability and timing requirements of conventional signaling links, wireline links have conventionally been utilized. While wireline signaling links are extremely reliable, they are not always available. For example, in some instances it may be desirable to set up a temporary telecommunications signaling network in a remote area in which wireline signaling links are not available. Examples of situations where this might be desirable include military applications in which signaling points may be required to be mobile, new construction applications in which temporary networks are set up until wireline facilities can be constructed, natural disaster and weather-related applications in which temporary networks can be set up when wireline signaling are damaged, and remote area applications in which construction of wireline TDM links is not feasible. Because conventional signal transfer points only use wireline signaling links, setting up such temporary, remote area or mobile networks has not previously been possible.

Accordingly, there exists a long felt need for methods and systems for providing signal transfer points with wireless signaling link interfaces.

DISCLOSURE OF THE INVENTION

The subject matter described herein includes methods and systems for providing signal transfer points with wireless signaling link interfaces, such as wireless local area network signaling interfaces. Such a signal transfer point may include a link interface module for performing signal transfer functions for routing messages between SS7 signaling links. A wireless local area network interface operatively associated with the link interface module may send and receive SS7 signaling messages over a wireless local area network interface, thereby implementing an STP having a WLAN signaling link interface. An STP having a WLAN signaling link interface may be deployed in areas where wireline facilities are not available. In addition, an STP having a WLAN signaling link interface may be mobile, provided that its power supply is mobile. As a result, an STP having a WLAN signaling link interface according to the subject matter described herein greatly reduces time required to set up signaling networks.

Accordingly, it is an object of the subject matter described herein to provide methods and systems for setting up signaling networks in areas in which wireline-based signaling links are not available.

It is another object of the subject matter described herein to provide methods and systems for providing a mobile signal transfer point.

Some of the objects of the subject matter described herein having been stated hereinabove, and which are addressed in whole or in part by the subject matter described herein, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 2:
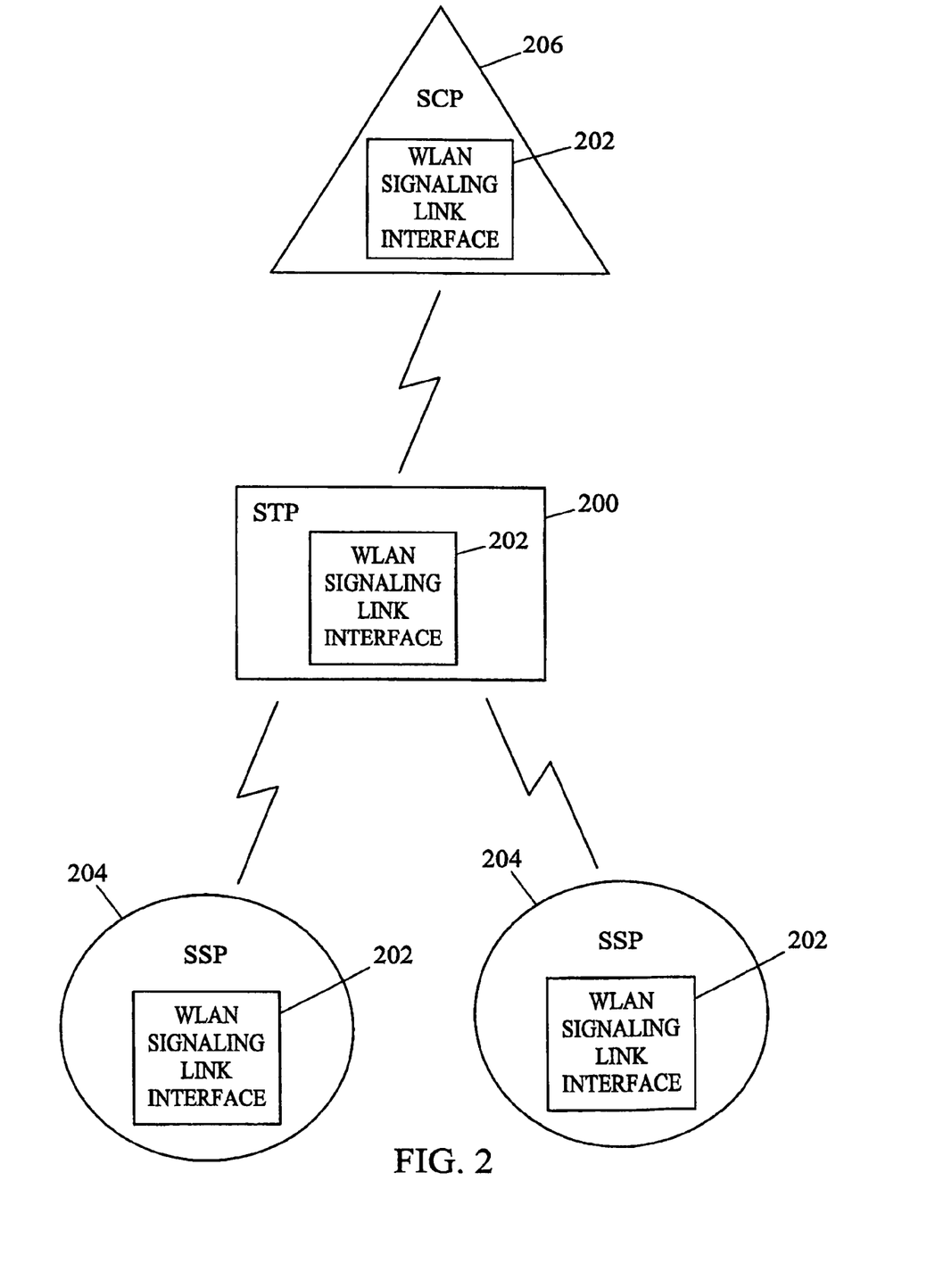
FIG. 2 is a network diagram illustrating a telecommunications signaling network including an STP with a WLAN signaling link interface according to an embodiment of the subject matter described herein.

In order to provide an STP that is both mobile and that can be set up in areas where wireline signaling links are not available, the subject matter described herein includes an STP with a WLAN signaling link interface. FIG. 2 illustrates an exemplary telecommunications signaling network including an STP with a WLAN signaling link interface according to an embodiment of the present invention. Referring to FIG. 2, STP 200 includes a WLAN signaling link interface 202. WLAN signaling link interface 202 may be any suitable WLAN interface capable of bi-directionally carrying signaling messages over a wireless network. Examples of WLAN interfaces suitable for use with embodiments of the subject matter described herein include 802.11a interfaces, 802.1b interfaces, 802.11g interfaces, 802.16 interfaces, 802.20, Bluetooth interfaces, and GPRS interfaces. In order to communicate with WLAN signaling link interface 202, SSPs 204 and SCP 206 preferably also include WLAN signaling link interfaces 202. Because STP 200 and signaling points 204 and 206 have WLAN signaling link interfaces, a signaling network can be established quickly without solely relying on wireline TDM signaling links.

Exemplary applications for STP 200 may include any of the applications described above, such as temporary or permanent signaling networks for military, remote area, or weather-related applications. Thus, one aspect of the subject matter described herein may include establishing a WLAN-based signaling network. Such a method may include providing an STP, such as STP 200, with at least one WLAN signaling link interface. The method may also included connecting at least one other SP, such as SSP 204, SCP 206, a media gateway controller, a session initiation protocol server, an IP multimedia service call session control function (IMS CSCF) or other signaling point, to STP 100, to the WLAN signaling link interface of the STP vial the WLAN signaling link interface of the STP.

Figure 3:
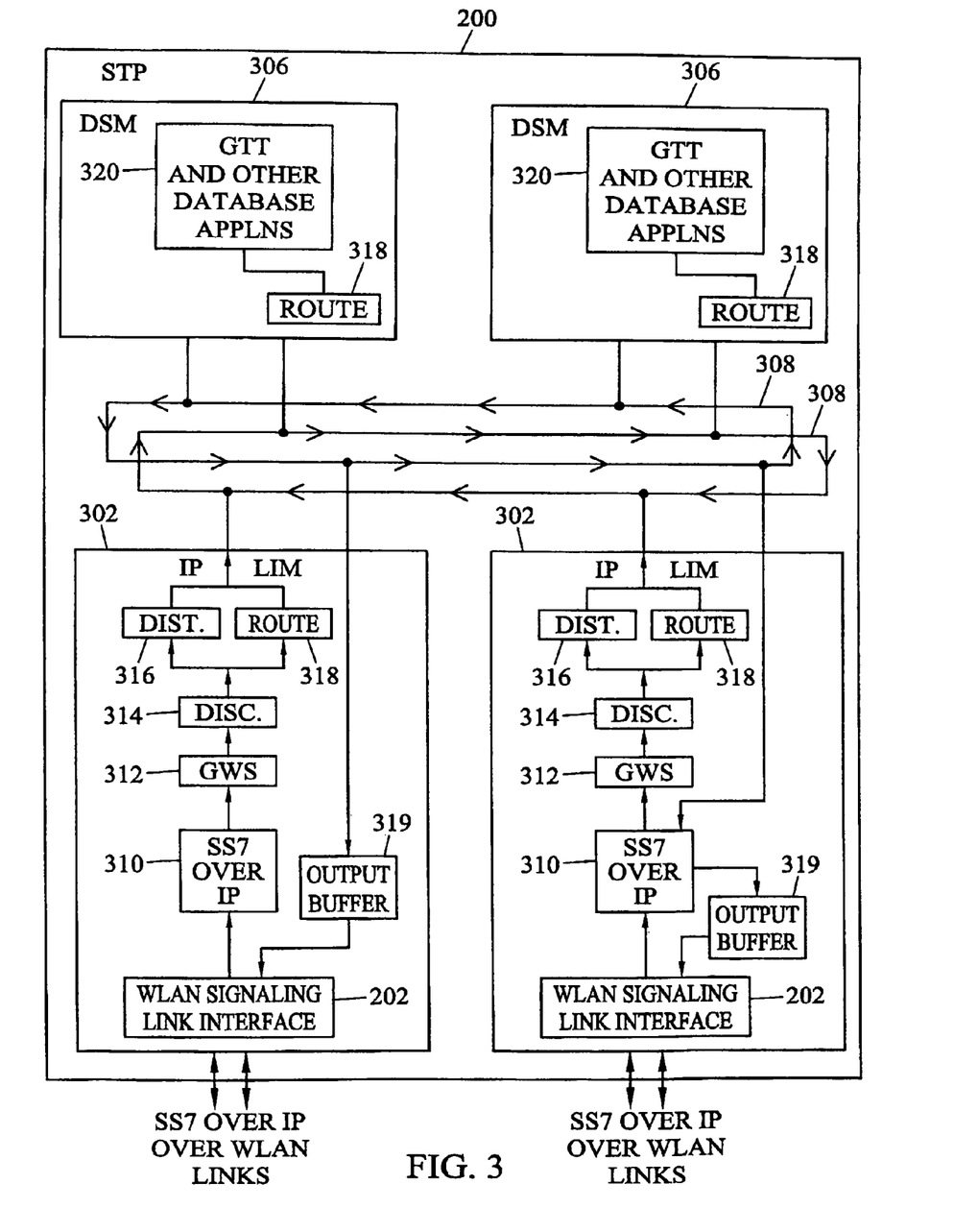
FIG. 3 is a block diagram illustrating an exemplary internal architecture for an STP having a WLAN-based signaling link interface according to an embodiment of the subject matter described herein.

FIG. 3 is a block diagram illustrating an exemplary internal architecture for STP 200 illustrated in FIG. 1. In FIG. 3, STP 200 includes a first IP link interface module 302, a second IP link interface module 302, and database service modules 306. From a hardware perspective, each of these modules may include an application processor for executing telecommunications applications and a communications processor for communicating with other modules via bus 308.

IP Link interface modules 302 each include WLAN signaling link interface 202, SS7 over IP layers 310, gateway screening function 312, discrimination function 314, distribution function 316, routing function 318, and output buffer 319. WLAN signaling link interface 202 may implement any of the above-described WLAN protocols for sending and receiving SS7 signaling messages over a WLAN interface. SS7 over IP layers 310 include network, transport, and SS7 signaling adaptation layers for sending and receiving SS7 signaling messages over IP. Exemplary layers that may be included in SS7 over IP layers 310 include M3UA over SCTP/IP, M2PA over SCTP/IP, SUA over SCTP/IP, or TALI over TCP/IP, as described in the corresponding IETF Internet Drafts and RFCs. Gateway screening function 312 screens inbound SS7 messages based on the originating and/or destination point code in the signaling messages to determine whether the signaling messages are to be allowed into the network. Discrimination function 314 determines whether received signaling messages are destined for an internal processing module within STP 200 or whether the messages are to be through switched.

For messages that are to be through switched, discrimination function 314 sends these messages to routing function 318. Routing function 318 routes the messages to the interface module associated with the outbound signaling link. For messages that require internal processing, discrimination function forwards these messages to distribution function 316. Distribution function 316 distributes these messages to the appropriate internal processing module within STP 200. Output buffer 319 stores outbound signaling messages to be sent over the WLAN signaling link interface.

DSMs 306 include global title translation (GTT), number portability translation, and other database applications for performing routing address translations for received signaling messages and routing functions 318 for routing the messages after such translations are performed. In one exemplary implementation, DSMs 306 may be identically provisioned so that IP LIMs 302 can load share messages among DSMs 306.

Figure 4:
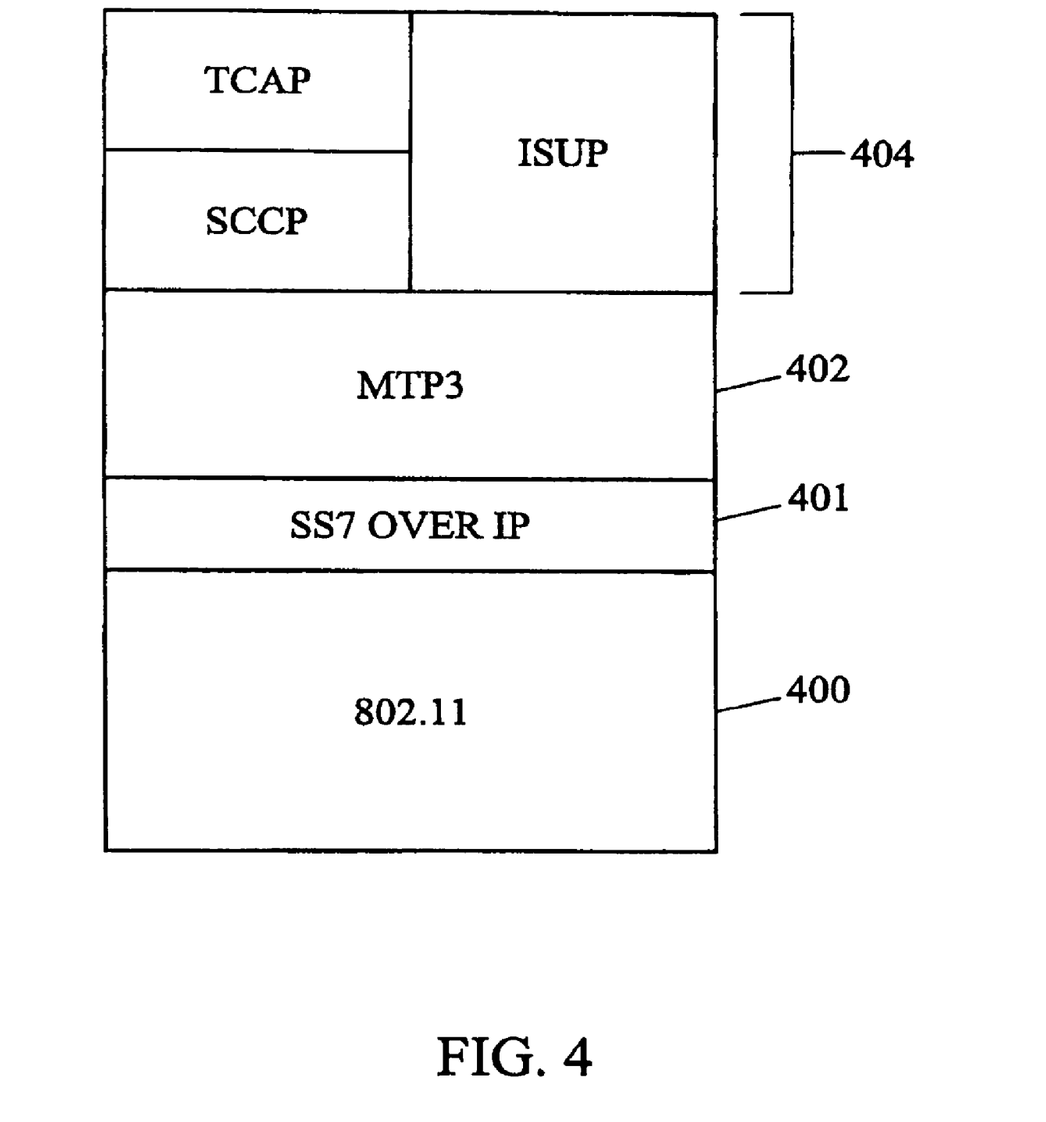
FIG. 4 is a protocol layer diagram illustrating exemplary protocol layers that may be implemented by a WLAN interface on an STP having a WLAN-based signaling link interface according to an embodiment of the subject matter described herein.

FIG. 4 is a protocol layer diagram illustrating exemplary protocol layers for implementing a WLAN-based signaling link interface according to an embodiment of the. In the illustrated example, the protocol layer diagram includes an 802.11 layer 400, SS7 over IP layers 401, an MTP 3 layer 402, and SS7 application layers 404. In FIG. 4, 802.11 layer 400 includes functions for sending and receiving SS7 messages over a bi-directional WLAN-based signaling link. Because most WLAN protocols, such as 802.11, perform many of the error correction and detection functions of SS7 levels 1 and 2, these levels may not be necessary in sending and receiving SS7 messages over a WLAN signaling link interface. Accordingly, SS7 levels 1 and 2 may be replaced by the 802.11 layer. However, in an alternate implementation, SS7 levels 1 and 2 may be encapsulated within a WLAN layer so that a WLAN-based SS7 signaling message includes a full SS7 protocol stack. SS7 over IP layers 401 may implement any of the network, transport, and SS7 adaptation layers described above. MTP 3 layer 402 implements MTP routing and network management functions. SS7 application layers 404 include SCCP, TCAP, and ISUP layers for implementing SS7 application level functions, such as call setup, call tear down, and database queries and responses. SS7 application layers 404 may also include a mobile application part (MAP) layer for carrying mobile call and short message service (SMS) signaling data.

Although FIG. 4 illustrates 802.11 as the WLAN protocol, the subject matter described herein is not limited to using 802.11 as the WLAN protocol. As described above, any suitable wireless local area network protocol for sending and receiving signaling messages may be used without departing from the scope of the subject matter described herein.

Figure 5:
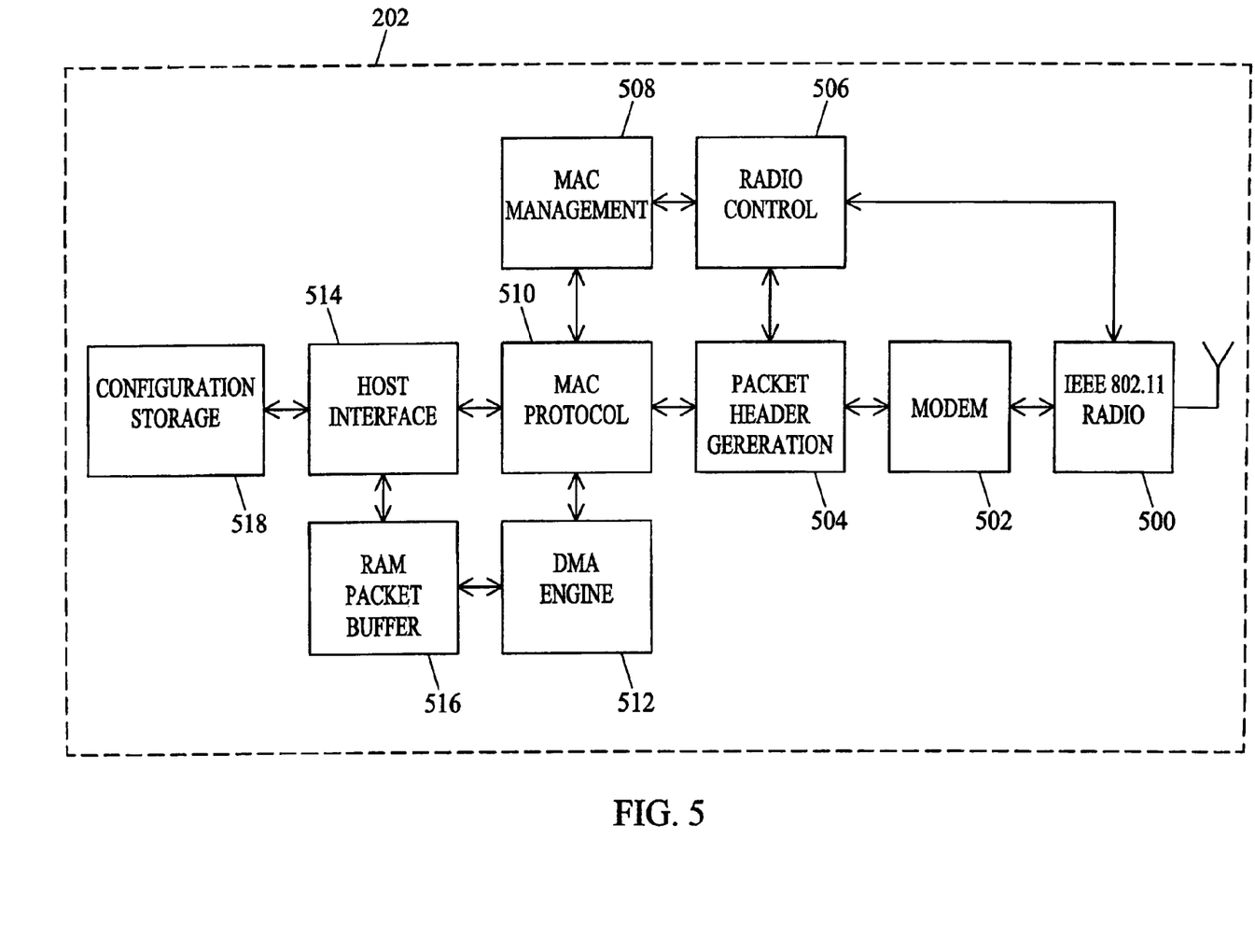
FIG. 5 is a block diagram of an exemplary WLAN interface that may be used in an STP having a WLAN-based signaling link interface according to an embodiment of the subject matter described herein.

FIG. 5 is a block diagram illustrating an exemplary WLAN signaling link interface 202 suitable for use in an STP having a WLAN signaling link interface according to an embodiment of the subject matter described herein. Referring to FIG. 5, WLAN signaling link interface 202 includes a radio interface 500, a modem 502, a packet header generation function 504, a radio control function 506, a MAC management function 508, a MAC protocol function 510, a DMA engine 512, a host interface 514, a packet buffer 516, and configuration storage 518. In the illustrated example, radio interface 500 comprises an 802.11 interface for sending and receiving messages over an 802.11 link. Such an interface may include an antenna and impedance matching circuitry for transmitting and receiving signals at one of the 802.11 frequencies. Modem 502 modulates a carrier signal with data to be transmitted and demodulates received data from a carrier signal. Packet header generator 504 generates 802.11 packet headers. Radio control interface 506 monitors and controls radio interface 500. For example, radio control interface 506 may switch frequencies if one frequency results in poor transmission or reception. MAC management layer 508 manages functions performed by MAC protocol layer 510. MAC protocol layer 510 performs MAC layer functions, such as framing, error detection, error correction, collision detection, collision avoidance and other functions required to control access to the underlying wireless medium. DMA engine 512 controls the overall operations of interface 202. Host interface 504 sends and receives data from the host in which interface 202 is located. For example, host interface 514 may receive SS7 data to be sent over the WLAN signaling link and may send SS7 data received over the WLAN signaling link to other systems within STP 200. Packet buffer 516 stores packets received from and to be sent over the WLAN signaling link interface. Configuration storage 518 stores the configuration of WLAN interface.

Figure 6:
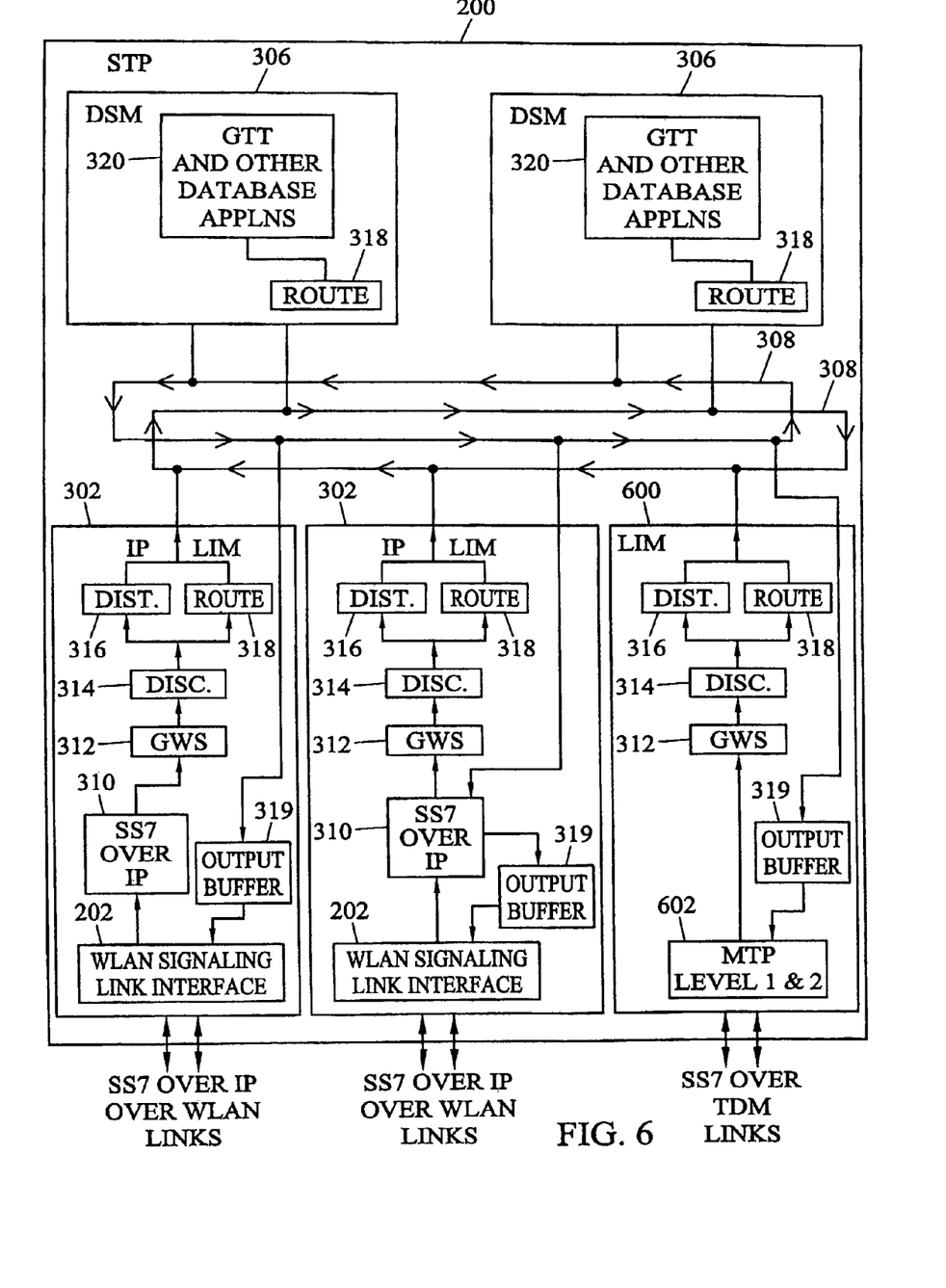
FIG. 6 is a block diagram illustrating an exemplary internal architecture for a wireline/WLAN gateway STP according to an embodiment of the subject matter described herein.

In the embodiment illustrated in FIG. 3, the STP includes only WLAN interfaces. However, the subject matter described herein is not limited to such an embodiment. In an alternate embodiment of the subject matter described herein, an STP may include WLAN and wireline signaling link interfaces. Such an STP may include a gateway function for translating between the WLAN and wireline TDM protocols. FIG. 6 is a block diagram of an STP 200 including a wireline/WLAN gateway LIM according to an embodiment of the subject matter described herein. In FIG. 6, wireline/WLAN gateway LIM 600 includes the same SS7 level functions as the LIMs illustrated in FIG. 3. In addition, wireline/WLAN gateway LIM 600 includes MTP level 1 and 2 function 602 for communicating SS7 messages over TDM wireline signaling links. MTP level 1 and 2 function 602 terminates SS7 levels 1 and 2 for received messages. As a result, the WLAN interfaces on the other LIMs can simply insert the SS7 messages into WLAN packets for outbound transmission. For outbound signaling messages received over a WLAN interface, MTP level 1 and 2 function 602 may insert the appropriate SS7 level 1 and 2 information for outbound transmission.

Figure 7:
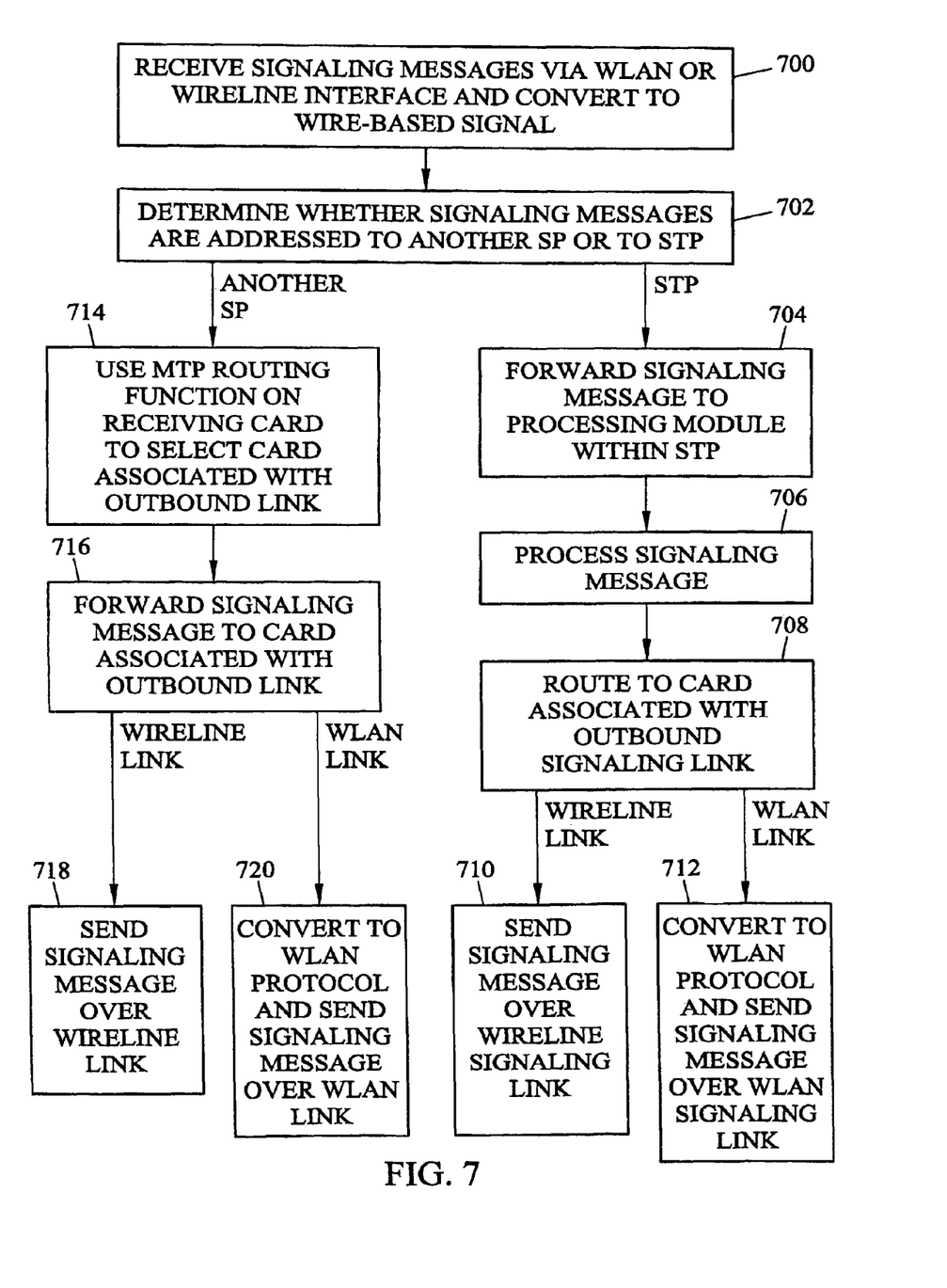
FIG. 7 is a flow chart illustrating exemplary steps for sending and receiving signaling messages over WLAN-based signaling links at an STP according to an embodiment of the subject matter described herein.

FIG. 7 is a flow chart illustrating exemplary overall steps that may be performed in sending and receiving signaling messages over WLAN signaling links according to an embodiment of the subject matter described herein. Referring to FIG. 7, in step 700, signaling messages are received via WLAN or wireline interfaces at an STP. In step 702, it is determined whether the signaling messages are addressed to another signaling point or to the STP. Referring to FIG. 6, this determination may be made by discrimination functions 314 associated with any of the link interface cards. If discrimination function 314 determines that the message is addressed to STP 200, control proceeds to step 704 where the message is forwarded to an internal processing module within the STP. An example of an internal processing module includes any one of DSMs 306 where GTT or other database services may be performed. In step 706, the internal processing is performed on the message.

In step 708, the internal processing module routes the message to the card associated with the outbound signaling link. This step may be performed by routing functions 318 associated with DSM 306. The outbound signaling link is a wireline link, control proceeds to step 710 where the signaling message is converted to a WLAN protocol and sent over a WLAN signaling link. Returning to step 702, if it is determined that the message is addressed to another signaling point, control proceeds to step 714 where the MTP routing function on the receiving card selects a card associated with the outbound signaling link. For example, routing functions 318 on any of cards 302, 304, or 600 illustrated in FIG. 6 may perform this step. In step 716, the routing function forwards the signaling message to the card associated with the outbound signaling link. If the outbound signaling link is a wireline link, control proceeds to step 718 where the message is sent over the wireline link. If the outbound signaling link is a WLAN link, control proceeds to step 720 where the signaling message is converted to a WLAN protocol and sent over the WLAN signaling link.

Thus, the subject matter described herein includes an STP with a WLAN signaling link interface that replaces traditional TDM interfaces. The WLAN interface allows STPs to be set up in areas in which conventional wireline signaling links are not available. In addition, the STP may be mobile and fully operational while being moved. Such an STP may be useful in military applications or applications in which it is necessary to change the location of the signaling network interface infrastructure.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A signal transfer point (STP) having a wireless local area network (WLAN) signaling link interface, the signal transfer point comprising:
   (a) an Internet protocol (IP) link interface module in the STP for performing SS7 signal transfer functions for routing signaling messages between IP-capable SS7 signaling points; and
   (b) a first WLAN signaling link interface in the STP and operatively associated with the IP link interface module for sending SS7 signaling messages to and receiving SS7 signaling messages from the IP capable SS7 signaling points over a first WLAN signaling link using a WLAN protocol, wherein the first WLAN signaling link interface allows the STP to be set up in an area where wireline signaling links are not available.

2. The signal transfer point of claim 1 wherein the first WLAN signaling link interface comprises an 802.11 interface.

3. The signal transfer point of claim I wherein the first WLAN signaling link interface comprises an 802.16 interface.

4. The signal transfer point of claim 1 wherein the first WLAN signaling link interface comprises an 802.20 interface.

5. The signal transfer point of claim 1 wherein the first WLAN signaling link interface comprises a general packet radio service (GPRS) interface.

6. The signal transfer point of claim 1 wherein the first WLAN signaling link interface comprises a Bluetooth interface.

7. The signal transfer point of claim 1 comprising a second link interface module including SS7 level 1 and 2 functions for interfacing with wireline-based SS7 signaling links.

8. A telecommunications signaling system having wireless signaling links, the telecommunications signaling system comprising:
   (a) a signal transfer point (STP) having a first wireless signaling link interface for sending and receiving signaling messages over a wireless signaling link using a wireless local area network protocol, wherein the first wireless signaling link interface allows the STP to be set up in an area where wireline signaling links are not available; and
   (b) a signaling point operatively associated with the signal transfer point for receiving signaling messages from the signal transfer point and for sending signaling messages to the signal transfer point, the signaling point including a second wireless signaling link interface for sending the signaling messages to the signal transfer point and receiving the signaling messages from the signal transfer point over the wireless signaling link.

9. The system of claim 8 wherein the STP includes an Internet protocol (IP) link interface module and wherein the first wireless signaling link interface is located on the IP link interface module for sending and receiving SS7 over IP signaling messages over the wireless signaling link.

10. The system of claim 8 wherein the signal transfer point includes:
- a first link interface module for sending and receiving SS7 messages, wherein the first wireless signaling link interface is located on the first link interface module; and
- a second link interface module, wherein the second link interface module includes a wireline-based signaling link interface.

11. The system of claim 8 wherein the signal transfer point is mobile.

12. The system of claim 8 wherein the signaling point includes a service switching point.

13. The system of claim 8 wherein the signaling point includes a service control point.

14. The system of claim 8 wherein the signaling point includes a media gateway controller.

15. The system of claim 8 wherein the signaling point includes a session initiation protocol (SIP) server.

16. The system of claim 8 wherein the signaling point includes an IP multimedia subsystem call session control function (IMS CSCF).

17. A method for communicating signaling messages to and from a signal transfer point, the method comprising:
(a) sending signaling messages to a signal transfer point via a wireless signaling link using a wireless local area network protocol;
(b) at the signal transfer point, receiving the signaling messages from the wireless signaling link via a wireless signaling link interface, wherein the wireless signaling link interface allows the STP to be set up in an area where wireline signaling links are not available; and
(c) at the signal transfer point, forwarding signaling messages to other signaling points via the wireless signaling link interface using the wireless local area network protocol.

18. The method of claim 17 wherein receiving the signaling messages via the wireless signaling link interface includes receiving IP-encapsulated SS7 signaling messages via the wireless signaling link interface.

19. The method of claim 17 comprising receiving the signaling messages at the signal transfer point via a wireline signaling link interface, identifying messages destined for the wireless signaling link, and forwarding the signaling messages identified as being destined to the wireless signaling link to the signaling points via the wireless signaling link interface.

20. The method of claim 19 wherein identifying messages destined for the wireless signaling link includes examining MTP layer 3 information in the signaling messages using a routing function resident on the same card as the wireline signaling link interface.

21. The method of claim 17 comprising receiving SS7 signaling messages via the wireless signaling link interface and forwarding at least some of the SS7 signaling messages to other signaling points via the wireline signaling link interface.

22. The method of claim 21 wherein forwarding at least some of the SS7 signaling messages to other signaling points via the wireline signaling link interface includes examining SS7 MTP layer 3 information in the signaling messages received via the wireless signaling link interface using a routing function located on the same card as the wireless signaling link interface to identify signaling messages destined for the wireless signaling link and forwarding the signaling messages identified as being destined for the wireless signaling link to a card on which the wireless signaling link interface is located.

23. The method of claim 17 wherein the wireless signaling link interface comprises a wireless local area network (WLAN) signaling link interface.

24. A method for establishing a wireless telecommunications signaling network, the method comprising:
(a) providing a signal transfer point (STP) having at least one wireless signaling link interface that uses a wireless local area network protocol, wherein the at least one wireless signaling link interface allows the STP to be set up in an area where wireline signaling links are not available;
(b) providing at least one signaling point (SP) having at least one wireless signaling link interface that uses a wireless local area network protocol; and
(c) connecting the at least one wireless signaling link interface of the STP to the at least one wireless signaling link interface of the SP via a wireless signaling link.

25. The method of claim 24 wherein providing the STP and the SP includes locating the STP and the SP in an area without wireline signaling link facilities.

26. The method of claim 24 wherein providing the STP and the SP includes locating the STP and the SP in an area in which existing wireline signaling link facilities are damaged.

27. The method of claim 24 wherein providing the SP includes providing a service switching point (SSP).

28. The method of claim 24 wherein providing the SP includes providing a service control point (SCP).

29. The method of claim 24 wherein providing the SP includes providing a media gateway controller (MGC).

30. The method of claim 24 wherein providing the SP comprises providing a session initiation protocol (SIP) server.

31. The method of claim 24 wherein providing the SP comprises providing an IP multimedia subsystem call session control function (IMS CSCF).

* * * * *